United States Patent [19]

Todd, Jr.

[11] Patent Number: 5,084,293

[45] Date of Patent: Jan. 28, 1992

[54] ACTIVATED ASCORBIC ACID ANTIOXIDANT COMPOSITIONS AND CAROTENOIDS, FATS, AND FOODS STABILIZED THEREWITH

[75] Inventor: Paul H. Todd, Jr., Kalamazoo, Mich.

[73] Assignee: Kalamazoo Holdings, Inc., Kalamazoo, Mich.

[21] Appl. No.: 544,248

[22] Filed: Jun. 26, 1990

[51] Int. Cl.$^5$ ............... A23D 9/06; A23B 7/10
[52] U.S. Cl. .................. 426/541; 426/3; 426/72; 426/640
[58] Field of Search ............ 426/72, 591, 640, 541, 426/542, 654, 648, 651, 3

[56] References Cited

U.S. PATENT DOCUMENTS

| | | | |
|---|---|---|---|
| 2,511,804 | 6/1950 | Hall | 426/541 |
| 3,008,832 | 11/1961 | Gorsica | 426/651 |
| 3,110,598 | 11/1963 | Mueller . | |
| 3,316,101 | 4/1967 | Borenstein . | |
| 3,455,838 | 7/1969 | Morotta . | |
| 3,767,825 | 10/1973 | Hammes | 426/72 |
| 3,800,047 | 3/1974 | Pulley | 426/72 |
| 3,833,743 | 9/1974 | Morse | 426/651 |
| 3,899,598 | 8/1975 | Fischer | 426/72 |
| 3,906,116 | 9/1975 | Quesnel | 426/651 |
| 3,966,632 | 6/1976 | Colliopoulos | 426/604 |
| 4,070,488 | 1/1978 | Davis | 426/72 |
| 4,187,332 | 2/1980 | Josse | 426/72 |
| 4,451,488 | 5/1984 | Cook | 426/640 |
| 4,504,499 | 3/1985 | Finnan . | |
| 4,614,656 | 9/1986 | Tennikat | 426/653 |
| 4,877,635 | 10/1989 | Todd | 426/542 |
| 4,925,681 | 5/1990 | Mai | 426/542 |

FOREIGN PATENT DOCUMENTS 326829  2/1988  European Pat. Off. .

*Primary Examiner*—Carolyn Paden
*Attorney, Agent, or Firm*—Gordon W. Hueschen

[57] ABSTRACT

An activated ascorbic acid and compositions thereof are disclosed, especially such essentially anhydrous compositions as embody propylene glycol or a nonionic surface-active agent, which products have increased antioxidant activity in fats, oils, carotenoids, and fatty foods, especially in such materials as are exposed to oxidative stress. Further a method of stabilizing such materials and products against oxidative discoloration is disclosed wherein feeds and foodstuffs are stabilized with such composition, and a method of stabilizing a feed or foodstuff or flavoring with such an antioxidant composition, are all disclosed. Synergistic effects are obtained by the incorporation of a natural antioxidant, such as a Labiatae or tea extract, or a tocopherol therein, and antioxidant power and stabilization effectiveness is frequently further improved by inclusion therein of a second nonionic surface-active agent.

42 Claims, 2 Drawing Sheets

FIG. 1

ACTIVATED ASCORBIC ACID ANTIOXIDANT COMPOSITIONS AND CAROTENOIDS, FATS, AND FOODS STABILIZED THEREWITH

BACKGROUND OF THE INVENTION

1. Field of Invention

A novel activated ascorbic acid in the form of a "complex", which has important antioxidant properties in water-insoluble substrates such as fats, oils, flavorings, and carotenoid preparations.

2. Background of the Invention and Prior Art

Oxidation of fats, oils, flavorings, and carotenoids is well known to degrade these substances, reducing the biological activity of vitamins or provitamins they may contain, diminishing their color stability, creating undesirable flavors and aromas, and also creating various oxidized forms thereof, especially of fats, which are considered to be injurious to health.

Inhibition of this oxidation process is normally accomplished commercially be the addition of synthetic antioxidants. These are adapted to the particular substrate, e.g., fat, oil, carotenoid, or flavoring, by the user prior to its incorporation into food. A primary reason for not incorporating the antioxidant earlier is the requirement that the antioxidant be selected for the particular substrate—food to be stabilized. Specific antioxidants are not generally adapted to be incorporated into all foods.

Synthetic antioxidants have played, and continue to play, the most important role in substrate stabilization. Among these are propyl gallate, butylated hydroxyanisole, butylated hydroxy toluene, tertiary butylated hydroxy quinone (which is not permitted for use in the EEC or Japan), and fatty acid esters of ascorbic acid, such as ascorbyl palmitate. More recently, the public distrust of the use of synthetic substances in foods has encouraged the food industry to substitute natural antioxidants for the synthetic ones. Of most importance in this category are rosemary extracts and tocopherols.

The oxidative process begins immediately upon completion of the refining of the substrate, and it is most efficacious to introduce the antioxidant immediately upon completion of refining. This prevents the formation of oxidation promoters, which are the first step in the oxidative process. Addition of antioxidants hours or days after refining is much less effective, since the initiators propagate themselves, and the antioxidant dosage must be much greater to counteract them. Refiners and users of the existing fat-soluble antioxidants, whether natural or synthetic, cannot take advantage of the added protection which their immediate addition would afford, since the synthetics are only used in specific food applications, and the naturals may have flavor or other effects which are not universally acceptable.

Ascorbic acid, which is water-soluble and fat-insoluble, is considered to be an antioxidant in some aqueous systems, although it has also been reported to be a pro-oxidant to carotenoids in orange juice. In prepared meats it is widely used to preserve the color, where it acts as a reducing agent which converts nitrates and nitrites to nitrous oxide, which then reacts with heme pigments to form stable red colors. It is not an antioxidant in that application. It is added as a powder and becomes dissolved in the aqueous phase of the food, or as a solution in water. It has not been used in the stabilization of essentially water-insoluble substances, such as fats, oils, carotenoids, and terpene flavorings, in which applications the art has considered it ineffective. This is in accord with the teaching of the present specification.

Since the prior art considers ascorbic acid to be ineffective as an antioxidant in hydrophobic substrates, it uses synthetic fatty acid ester derivatives, which are fat soluble. These esters are exceptionally costly and do not fall within the narrow definition of natural. Surprisingly, they are not as effective on a weight for weight basis as the activated ascorbic acid of this invention.

More recently, a ternary mixture of ascorbic acid, lecithin (an ionic phospholipid), and tocopherols has been shown to possess greater antioxidant properties than identical mixtures of ascorbyl palmitate, lecithin, and tocopherols. Mixtures of lecithin and ascorbic acid were not shown to be effective, but that development was dependent upon tocopherols being present to form a ternary mixture. The presence of lecithin is objectionable according to my findings, and the presence of tocopherols may be advantageous, but is strictly optional according to my invention.

In addition to being effective as an antioxidant for fats, oils, flavorings, carotenoids, and the like, the activated ascorbic acid of this invention represents a great improvement over the prior art in the stabilization of carotenoids and especially carotenoid colors. The prior art uses synthetic antioxidants, such as ethoxyquin, or encapsulation in a gelatin matrix of a carotenoid dissolved in a solvent (with subsequent removal of the solvent), to protect the carotenoid from fading. This invention achieves the same results without the use of objectionable solvents, as well as protecting against failure in the encapsulation process.

THE INVENTION

It has been found that ascorbic acid (AA) may be made into an effective antioxidant for water-insoluble substrates by forming an essentially anhydrous solution or paste in a non-ionic substance (hereafter called "activator") which has both hydrophilic and lipophilic properties, and is therefore a surface-active agent, or mixtures thereof, by predisolving the ascorbic acid in a solubilizing medium, such as methanol-water, admixing this with the activator, and removing the solvent to form an essentially anhydrous composition of the activator and of ascorbic acid which, for the purposes of this specification, will be called a complex. It may also be activated, but not as well, by predissolving in propylene glycol without the use of other solvent, in which case the propylene glycol solubilizing medium may remain since no solvent must be removed and no surface-active agent (other than the propylene glycol itself) need be employed or included.

This activated form of ascorbic acid (AAA), when incorporated into fats, oils, terpenoids, or preparations of carotenoids, is found to be more effective, on a weight for weight basis, than ascorbyl palmitate or the common synthetic antioxidants of commerce. Without this "activation," the ascorbic acid is essentially without effect in these same substrates.

The mechanism by which the activator changes the ascorbic acid from an inert substance to an active one is not known. Likewise, there is no explanation of why predissolving the ascorbic acid in a solvent, combining it with the activator, and removing the solvent, should be critical to the process. Logic would dictate that simply admixing the ascorbic acid with the activator would produce the same effect, but this is not the case.

It is, for example, conceivable but unlikely that a hydrogen bond is established between the ascorbic acid and activator by the method of preparation which enables the ascorbic acid to function in the substrate, and it is this hydrogen bonded form of ascorbic acid which is effective. This speculative explanation is not intended to be limiting.

This specification, for the first time, describes a novel activated form of ascorbic acid, which is an exceptionally powerful antioxidant and preservative in water-immiscible substrates, which is effective in combination with other natural antioxidants, which can be added immediately at the completion of refining of the substrate, and which is cost-effective. It simply adds to the Vitamin C content of the food, and does not introduce an antioxidant foreign to nature. It adds no flavor or other adverse quality to the substrate which it stabilizes, and is therefore adapted to general use at the immediate end of the refining process. Furthermore, overdosing does not cause pro-oxidant effects, as is the case with tocopherols and some other antioxidants, and therefore tight controls on addition are not required for general use.

Perhaps its greatest advantage over the other antioxidant preparations which are used in its target applications, aside from its greater efficacy, is the total absence of toxicity. Unlike the synthetic antioxidants, including ascorbyl palmitate, and the naturals, such as rosemary and tocopherols, it is not fat soluble after ingestion, but rather the water-soluble form of ascorbic acid becomes available as a Vitamin. As is well knowm, overdosing of Vitamin C is a virtual impossibility, whereas overdosing can occur with fat-soluble vitamins, such as Vitamin E (tocopherols), and use limitations are placed upon the synthetics. Surprisingly, however, the activated form of ascorbic acid is more effective than the synthetics at equal dosage levels.

BRIEF DESCRIPTION OF THE DRAWINGS

Referring now to the drawings for a better understanding of the invention.

OBJECTS OF THE INVENTION

To provide an activated form of ascorbic acid which is more effective at equal dose levels than existing antioxidants for the stabilization of fats and water-immiscible oils; to provide an activated form of ascorbic acid, in a non-ionic emulsifier or surfaceactive agent or in propylene glycol, which is a tasteless and odorless antioxidant when used in foods; to provide an activated form of ascorbic acid which functions as an antioxidant in the fatty phase of a food, but which provides Vitamin C activity upon ingestion; to provide an antioxidant preparation which causes no ill effect at high levels, and which cannot be overdosed; to provide an antioxidant preparation which is more cost-effective than existing synthetic alternatives; to provide an activated ascorbic acid antioxidant which can be combined with other antioxidant to achieve synergistic results; to provide an activated ascorbic acid complex which is more effective in stabilizing carotenoids when exposed to oxygen than any other previously known antioxidant or antioxidant combination; to provide a complex of ascorbic acid which may be combined with other natural and synthetic antioxidants to achieve synergism; and to improve the quality of the food supply by reducing the amount of oxidized substances which are developed in prepared foods. To demonstrate and disclose a practical and foolproof method of preparing such a valuable ascorbic acid complex, as well as substrates and foods incorporating the same. Still additional objects will become apparent hereinafter and yet other objects will be apparent to one skilled in the art.

SUMMARY OF THE INVENTION

The present invention, then, inter alia, comprises the following, singly or in combination:

An activated ascorbic acid (AAA) product having increased antioxidant activity especially in fats, oils, and fatty foods, comprising ascorbic acid in solution in (A) propylene glycol or (B) a nonionic surface-active agent, the solution being essentially anhydrous and, in the case of (B) the activated ascorbic acid-surface-active agent product being prepared by dissolving the ascorbic acid and nonionic surface-active agent in a liquid medium and removing solubilizing medium;

a method of preparing an activated ascorbic acid having increased antioxidant activity especially in fats, oils, and fatty foods, comprising the step of dissolving the ascorbic acid in (A) propylene glycol or (B) a nonionic surface-active agent, in the case of (B) in the presence of a liquid medium and removing solubilizing medium, to give an activated ascorbic acid product which is essentially anhydrous;

an activated ascorbic acid having increased antioxidant activity especially in fats, oils, and fatty foods, comprising ascorbic acid dissolved in propylene glycol;

a method of preparing an activated ascorbic acid having increased antioxidant activity especially in fats, oils, and fatty foods, comprising the step of dissolving ascorbic acid in propylene glycol; such an activated ascorbic acid product or method wherein the nonionic surface-active agent, when present, is selected from the group consisting of a. mono and di glycerides of fatty acids, b. polyglyceride esters of fatty acids, c. mono and diglyceride esters further esterified with a dibasic organic acid taken from the class consisting of citric and lactic acids, d. acetylated mono and diglyceride esters further esterified with a dibasic organic acid taken from the class consisting of citric and lactic acids, e. sorbitan esters of fatty acids, and f. propylene glycol esters of fatty acids;

such an AAA product wherein the product contains less than about 5% water by weight;

such an AAA method wherein no more than about 5% water by weight is left in the product;

such an AAA product or method wherein the solubilizing medium comprised a solvent selected from the group consisting of methanol, ethanol, isopropanol, and water, and mixtures thereof; such an AAA product or method wherein the product contains less than about 5% water, and wherein the solubilizing medium comprised a solvent selected from the group consisting of methanol, ethanol, isopropanol, and water, and mixtures thereof; such an activated ascorbic acid product including a natural antioxidant selected from the group consisting of a Labiatae extract, a tea extract, and a tocopherol; such a product wherein the natural antioxidant is a rosemary, sage, or thyme extract; such a method wherein the natural antioxidant is selected from the group consisting of a labiatae extract, a tea extract, and a tocopherol;

such a method wherein the natural antioxidant is a rosemary, sage, or thyme extract; and such activated ascorbic acid product prepared according to any such method and/or comprising also a second nonionic surface-active agent incorporated into the antioxidant composition. Further, a carotenoid, fat or oil, a food, a feed, or a chewing-gum base, which has been protected against oxidative deterioration having incorporated therein such an activated ascorbic acid product; and such a method of stabilizing a carotenoid, a fat or oil, a food, or a feed which comprises the step of incorporating therein such an activated ascorbic acid product. Moreover, such an AAA product or method wherein the amount of ascorbic acid is at least 1% by weight, preferably about 2% to about 8% by weight. Additionally, such an AAA method or product comprising a weight percentage of natural antioxidant of at least about 2% by weight. Also, such An AAA product or method wherein the nonionic surface-active agent is a monoglyceride of a fatty acid or a polyglycerol ester of a fatty acid, especially glycerol monooleate or decaglycerol capric-caprylate. Further, such an AAA product or method including a Labiatae extract in amount of about 4% to about 10% by weight, especially wherein the Labiatae extract is a rosemary, sage, or thyme extract, and particularly a product stabilized therewith wherein the stabilized product is oleoresin paprika. Finally, such an AAA product wherein the water content is not more than about 2% by weight and such an AAA method wherein not more than about 2% water by weight is left in the product.

Materials and Methods

Wherever possible, commercial sources of materials have been used. Also, procedures known to the art, or herein identified as a tool to be used by the practioner in the optimization of specific formulations, are described.

The emulsifiers were obtained from manufacturers, and are listed by their technical rather than trade names. They did not contain antioxidants.

Tea extract was derived from green tea leaves, and standardized to 16% of the antioxidant activity of the Herbalox TM.

Tocopherols and ascorbyl esters, e.g., palmitate, were food grade and obtained from a commercial manufacturer.

Flour salt was food grade and obtained from a manufacturer which supplies it to seasoning houses for use in making dispersions.

Methods: Unless otherwise specified, the effect of the emulsifier, rosemary, other antioxidants, and synergistic combinations were measured by exposing a dispersion of the carotenoid in soy oil on flour salt to air in an oven maintained at either 50 degrees or 65 degrees Celsius. The color was measured over time, and the number of hours required for the dispersion to lose one-third of its color is called the ⅔ life of the dispersion. As a rule of thumb, ½ of the ⅔ life in hours at 50 degrees gives the stability in days. Likewise, the number of hours to reach ⅔ life at 65 degrees is a close approximation of the stability in days. This technique is invaluable to the practitioner of the art, the number of potential advantageous combinations being enormous.

It is well known that, among the substrates for dispersion, salt gives the least stability. Dispersions on dextrose or in feeds have stabilities of several orders of magnitude greater, which is why they are not useful for screening studies, and why this invention offers such advantages when combined with a substrate which is less destabilizing than salt.

Glossary of Terms

This glossary describes both abbreviations used in the specification and other technical terms and apparatus referred to.

| Abbreviation | Technical Term |
| --- | --- |
| AA | ascorbic acid |
| AAA | activated ascorbic acid |
| BHA | butylated hydroxy anisole |
| BHT | butylated hydroxy toluene |
| GMO | glycerol monooleate |
| PG | propylene glycol |
| SBO | soy bean oil |
| STO | sorbitan trioleate |
| SMS | sorbitan monostearate |
| 8-1-O | octaglycerol monooleate |
| 10-1-CC | decaglycerol mono-capric-caprylate |
| RM | rosemary extract, specifically Herbalox-O TM product of Kalsec, Inc., Kalamazoo, Michigan |

Peroxide Value: This is also a standard test for evaluation of the degree to which an oil has been oxidized.

Labiatae Extract: The solvent extract of a Labiatae herb, and preferably rosemary, sage, or thyme, especially rosemary. The preferable form is that described in Todd U.S. Pat. No. 4,877,635, and standardized to an antioxidant strength of about twice that of BHT in soy oil, under the standard Rancimat TM conditions. It is commercially available in the form of Herbalox TM.

Rancimat TM: An instrument which measures the induction time of an oleogenous substrate, usually at 120 degrees Celsius and at 18 liters of air per hour. This is an accepted methodology for determining relative strengths of preparations of antioxidants. The effectiveness is expressed as the induction time of the sample divided by the induction time of the control, as a percent.

⅓ life: This is the time it takes for ⅓ of the color of a sample of paprika or pigment oleoresin to fade under the conditions of the experiment. It is a highly-reproducible measurement, which is sufficiently accurate to evaluate the relative effectiveness of emulsifiers and synergistic combinations thereof. This technique will assist practitioners of the art to optimize formulations for specific uses.

Synergism: As defined in McGraw-Hill *Dictionary of Scientific and Technical Terms*: "An action where the total effect of two active components is greater than the sum of their individual effects." For example, if one additive increases the ⅓ life by 10 hours, and a second by 20 hours, and the combination of the two by 50 hours, the syngeristic effect is an additional (or plus) 20 hours.

Surface-Active Agent: In the context of this specification, it represents a nonionic surface-active agent taken from the class consisting of:
  a. mono and di glycerides of fatty acids,
  b. polyglyceride esters of fatty acids,
  c. mono and diglyceride esters further esterified with a dibasic organic acid taken from the class consisting of citric and lactic acids,
  d. acetylated mono and diglyceride esters further esterified with a dibasic organic acid taken from the class consisting of citric and lactic acids,
  e. sorbitan esters of fatty acids, and
  f. propylene glycol esters of fatty acids.

RM Rosemary Extract: The extract used is Herbalox ™, which is a commercial product available from Kalsec, Inc., standardized as to antioxidant activity, and about 20% active antioxidant compounds. It should be recognized, in this connection, that the art does not yet enable one to determine the exact concentration of active antioxidants in the extract, and 20% is merely an approximation based on the degree of dilution of the deodorized rosemary extract with soy oil.

DETAILED DESCRIPTION OF THE INVENTION

The following Examples are given by way of illustration only and are not to be construed as limiting.

EXAMPLE 1

Preparation of Activated Forms of Ascorbic Acid

These preparations rely upon the activation of the ascorbic acid by dissolution in a solvent, which may contain water and a cosolvent, such as methanol, ethanol, isopropanol, or water alone, admixing the solution with an activator, and removing the solvent and water therefrom to give an essentially water-free composition. With most activators, a cosolvent with water is advantageous. Methanol-water is the preferred solvent, but it should be understood that the solvents enumerated are not limiting, since any mutual solvent will be advantageous based on the new art described in this specification.

Desolventization and drying may be effected advantageously under vacuum, and it is possible to use azeotropic mixtures to assist in water removal. However, if sufficient vacuum is available, this is not necessary.

A preferred form of activator is a common non-ionic emulsifier, such as already used in foods. These are described in greater detail in Example 9, and this example illustrates a preferred method of preparation of the activated ascorbic acid using three of the preferred emulsifiers.

Eight (8) grams of ascorbic acid was dissolved in 180 ml of methanol and 20 ml of water. This solution was added to 192 g of emulsifier, which was decaglycerol mono capric-caprylate (10-1-CC), glycerol monooleate (GMO), or octaglycerol monooleate(8-1-O). The mixtures were agitated and placed on a rotary evaporator, and the solvent removed at 70 deg C. bath temperature, increasing the vacuum to 26 inches at the end to remove residual water. All three preparations assayed less than 1% water by the Karl Fischer method.

These three preparations of activated ascorbic acid are shown, in Example 4, to be more effective than BHA and ascorbyl palmitate, which are representative of the antioxidants used in the present art.

Because the preparation of these complexes is exceptionally simple, and the results are so dramatic, it seems that they should have been items of commerce long ago. However, unless the critical step of predissolving the ascorbic acid in a solvent or cosolvent is taken, except in the case of propylene glycol, the preparations are either ineffective or even prooxidant. Perhaps since ascorbic acid incorporated directly into the activators is ineffective, as is ascorbic acid directly incorporated into the substrate to be stabilized, the unexpected result of its activation by the critical but simple method described herein was considered implausible, if considered at all.

EXAMPLE 2

Use of Activated Ascorbic Acid to Stabilize Soy Bean Oil

The soy bean oil used in this experiment had an iodine value of 130, and a peroxide value of <2, which indicates that oxidation has not been initiated. It represents as closely as possible the quality of oil to which the activated ascorbic acid can be added at the refinery, in order to achieve the maximum possible benefits.

Table 2-1 compares the effectiveness of the glycerol monooleate-activated ascorbic acid preparation of Example 1 with unactivated ascorbic acid in glycerol monooleate (GMO), i.e., glycerol monooleate to which 4% ascorbic acid had been added with warming and mixing. This table also shows the effectiveness of the synthetic antioxidants BHA (maximum permitted use level is 0.02%), ascorbyl palmitate, and of dry ascorbic acid (AA) added directly to the oil with warming.

The oil soluble rosemary extract, Herbalox (®), is included as a comparative oil soluble natural antioxidant.

The 4% solution of activated ascorbic acid (AAA) in glycerol monooleate was not completely homogenous in the soy oil, and after mixing, it was allowed to stand and the clear upper supernatant oil layer evaluated, as would be the case upon overdosing at the refinery to achieve maximum effect.

The 4% solution of AAA in glycerol monooleate was also diluted with propylene glycol in a ratio of 1:1.

GMO and PG were also dosed directly at 2.5%, to determine if they had antioxidant activity by themselves. They did not, which is typical of the activating emulsifiers.

Evaluations shown in Table 2-1 were made using a Rancimat(®) at 110 degrees C., 18 liters of air per hour, which is an accepted procedure for evaluation.

TABLE 2-1

Relative stabilities of soy oil with various types and doses of antioxidants, 110 deg. C., Rancimat

| Antioxidant | Dose of Antioxidant % | Induction Time hours | ratio to control |
|---|---|---|---|
| control | 0 | 7.6 | 100% |
| 2% dry AA in GMO | 0.05 | 8.0 | 105% |
| dry AA in SBO | 0.05 | 7.5 | 99% |
| 4% AAA in GMO (supernatant) | <0.05 | 11.9 | 156% |
| 2% AAA in PG/GMO | 0.05 | 13.7 | 180% |
| " | 0.0165 | 10.8 | 142% |
| ascorbyl palm. | 0.05 | 13.2 | 173% |
| BHA | 0.02 | 7.7 | 102% |
| rosemary | 0.05 | 8.9 | 118% |
| | dose, % | | |
| propylene glycol | 2.5 | 7.4 | 97 |
| GMO | 2.5 | 7.2 | 95 |

This shows the great effect of the activated ascorbic acid using two different forms of the preparation, both of which are highly effective. Of particular note is the greater effectiveness than an equal dose of ascorbyl palmitate, which is oil soluble, and the much higher effect than the most widely used synthetic, BHA. It is also more effective than the standard rosemary product. It is clear that the activators themselves, being GMO and PG, are not antioxidants. The results clearly show that ascorbic acid per se is inactive.

An alternative method of evaluation of the stabilizing ability of antioxidants is called the Schall oven technique. It involves placing the oils in an oven maintained at a constant temperature (in this case at 65 deg C.) and measuring the increase in peroxide value over time. A peroxide value of 70 is considered rancid.

Table 2-2 shows the Schall oven stabilites of oils stabilized with preparations made according to this disclosure, as well as those made with two other conventional antioxidants using the same oil and conditions. In the case of the oils dosed with PG, 10-1-CC, and 8-1-0, additions of 2.5% of the AAA-activator mixtures were made, agitated, and separated. This left the supernatant soy oil saturated with the activated ascorbic acid, which simplifies dosing on a commercial scale. Of course, dosing below saturation levels is also effective.

TABLE 2-2

Peroxide values of soybean oil after storage at 65 deg.

| Activator | % AAA in activator | % AAA, AP, or rosemary in SBO | peroxide value, day 12 | 16 | 20 |
|---|---|---|---|---|---|
| control oil | 0 | 0 | 92.4 | 136.6 | — |
| 10-1-CC | 2.0 | saturated, <0.05 | 7.3 | 15.2 | 23.0 |
| 8-1-0 | 2.0 | " | 11.5 | 23.0 | 26.7 |
| PG* | 2.0 | " | 7.5 | 15.4 | 30.5 |
| | 0 | AP, .05 | 15.3 | 34.5 | 36.4 |
| | 0 | rosemary, 0.05 | 36.2 | 83.8 | — |

*The ascorbic acid was dissolved directly in the PG.

It is clear from the above that the activated ascorbic acid is more effective than the fat soluble antioxidants, ascorbyl palmitate and rosemary, in the three activated preparations shown.

While the above table shows that dissolving ascorbic acid directly into propylene glycol activates it, it was found that this was not the case with glycerine. Although both natural and synthetic glycerin initially retard the increase in peroxide value in soy bean oil at 65 deg. C., after eleven days it becomes higher than that of the control. Clearly, the behavior of activation in propylene glycol, and in emulsifiers by predissolving the ascorbic acid in a mutual solvent, is a unique and unexpected phenomenon.

In summary, this example shows that ascorbic acid added directly to soy oil, or when added directly to a non-ionic activator, is not effective as an antioxidant in vegetable oil. It also shows that when activated, ascorbic acid is more powerful in retarding rancidity than other fat soluble antioxidants at equal dose levels.

EXAMPLE 3

Preparation of Clear Oil Solutions of Activated Ascorbic Acid

While it is not objectionable in most applications if the stabilized oil is cloudy, in those uses in which the consumer expects clarity, such as salad oil sold in grocery stores, clarity is required.

A 6.67% solution of AAA in propylene glycol was prepared by mixing 6.67 g of ascorbic acid with 93.3 g of propylene glycol and warming. 30 g of this was mixed with 70 g of glycerol monooleate. This mixture was added to soy oil and to canola oil at the levels shown in Table 3-1. Clarity is noted, as well as the induction time at 110 deg C. on the Rancimat(®). Ascorbic acid and BHA were also added directly to Canola Oil at 0.02 and 0.04% respectively. Canola oil is very high in omega-3 unsaturated fatty acids, which are also present in fish oil, and which are considered beneficial to health. It is clear that the activated ascorbic acid functions with omega-3 fatty acids as well as with the more common unsaturated fatty acids present in such oils as soy, sunflower, sesame, and safflower.

TABLE 3-1

Clarity and Induction times of soy and canola oils stabilized with varying amounts of GMO-PG-AAA preparations.

| | % stabilizer | % AAA in oil | clarity | induction time hours | ratio, % |
|---|---|---|---|---|---|
| Soy Oil | | | | | |
| control | 0 | 0 | | 7.05 | 100 |
| | 2% | 0.04% | hazy | 12.8 | 181 |
| | 1.0% | 0.02% | clear | 8.83 | 125 |
| | 0.5% | 0.01% | clear | 7.68 | 109 |
| Canola Oil | | | | | |
| control | 0 | | | 8.52 | 100 |
| 0.02% BHA | 0 | | | 8.37 | 98 |
| 0.04% AA | 0 | | | 8.48 | 99 |
| | 2% | 0.04% | clear | 17.3 | 203 |
| | 1% | 0.02% | " | 14.6 | 172 |
| | 0.5% | 0.01% | " | 11.7 | 138 |

It is perfectly clear that, not only does AAA have great effectiveness in soy oil, but that it has a totally unanticipated positive effect on canola oil, whereas neither BHA nor unactivated ascorbic have any effect. The behavior in high omega-3 fish oils is similar.

EXAMPLE 4

The Stabilization of Paprika Carotenoids with the Activated Ascorbic Acid Preparations of Example 1.

The activated ascorbic acid preparations are also surprisingly effective in the stabilization of paprika pigments, whereas unactivated ascorbic acid was not. Fifty parts of an oleoresin of paprika of approximately 120,000 color value, containing no additives, was diluted with 25 parts of the three preferred preparations of Example 1, and 25 parts of soy oil, to give an oleoresin of commonly used 60,000 color value, and 1% activated ascorbic acid. In addition, a control was made by diluting the 120,000 color value extract with an equal part of soy oil. A second control was made using 50 parts of oleoresin, 49 parts of soy oil, and one part of ascorbic acid added directly to the mixture with agitation and warming. A third set of controls was made using fifty part of oleoresin, 26 parts of soy oil, and 24 parts of the emulsifiers. A comparative control incorporated, with warming, ascorbyl palmitate at 0.6% into the mixture of equal parts of oleoresin and soy oil, and BHA at 0.2%, ten times its permitted level.

This oleoresin was plated onto flour salt at a concentration of 2%, and this dispersion was weighed into test tubes (2 g portions) which in turn were placed in an oven at 65 deg C. The tubes were periodically withdrawn, and the color value of the dispersion evaluated by extraction with acetone and reading the absorbance in a spectrophotometer. The time it took for $\frac{1}{3}$ of the color to fade is designated the $\frac{1}{3}$ life of the preparation, and indicates the relative stability.

Table 4-1 shows the remarkable effect of the activated ascorbic acid on the stability of the paprika color.

TABLE 4-1

The effect of activated and unactivated ascorbic acid on the $\frac{1}{3}$ life of paprika dispersions.

|  | $\frac{1}{3}$ life, hours | increase over control hours | % | emulsifier hours | control % |
|---|---|---|---|---|---|
| control | 36 | — | — |  |  |
| dry AA | 39 | 3 | 8 |  |  |
| BHA | 38 | 2 | 6 |  |  |
| AP | 58 | 22 | 61 |  |  |
| 10-1-CC | 48 | 12 | 33 |  |  |
| 10-1-CC + AAA | 170 | 134 | 472 | 122 | 339 |
| 8-1-0 | 55 | 19 | 53 |  |  |
| 8-1-0 + AAA | 239 | 203 | 563 | 184 | 511 |
| GMO | 59 | 23 | 64 |  |  |
| GMO + AAA | 249 | 213 | 592 | 190 | 528 |

Figure 1:
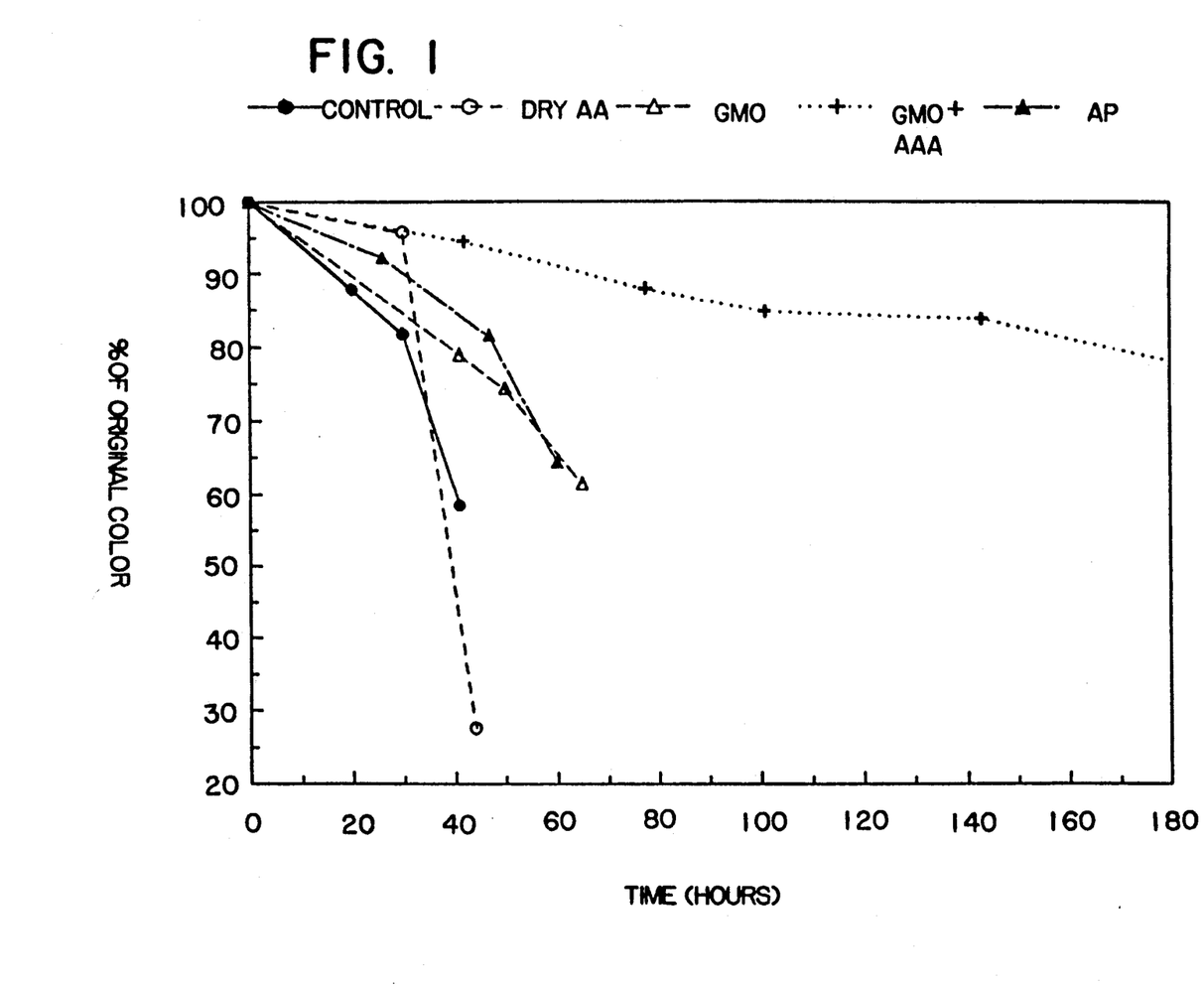
FIG. 1 is a graph showing the comparative fading rates of 2% weight by weight dispersions of oleoresin paprika at 65° C. wherein the abscissa shows the percent of original color at 460 nm retained by the sample and the ordinate shows the time period in hours required for ⅔ of the color to fade, thereby to provide the standard "⅔ life", there being a control and four (4) color-stabilizing compositions in the test, the dry AA, the AP, the GMO, and the GMO plus AAA curves illustrating the effectiveness of compositions of the present invention, their superiority in stabilizing oleoresin paprika against color fading being readily apparent from the graph of FIG. 1. (See Example 4).

FIG. 1 shows the actual plots of % of original color vs time for the control, AA, AP, GMO, and GMO+AAA of Table 4-1. It will be noted that there are essentially three sets of curves: the control and unactivated AA, the AP and GMO, and the GMO+activated ascorbic acid. The dramatic effect of activated ascorbic acid is obvious, as is the inactivity of ascorbic acid per se.

Table 4-1 also shows that the emulsifier-activators used in this example have a positive effect on the stability of the paprika, even though they are slightly prooxidant on the Rancimat(®) test. Because of this activity, the use of these emulsifiers for the paprika and other carotenoid stabilization systems is particularly advantageous. The usefulness of the emulsifiers in assisting in the stabilization of paprika is further described in a copending application.

In a separate experiment, ORP was dosed with GMO and GMO/AAA mixtures to give compositions containing 24% GMO only, and combinations of GMO/AAA to give 24% GMO and 0.5 and 1.0% AAA. The $\frac{1}{3}$ lives of the combinations, respectively, were 59, 129, and 249 hours at 65 deg. This shows that the AAA is a more powerful antioxidant, per % increase in AAA, as the concentration increases (the $\frac{1}{3}$ life increase is 60 hours for the first $\frac{1}{2}$% and 80 hours for the second $\frac{1}{2}$%). This surprising result is contrary to the prior art showing that above about 0.1%, AA is a prooxidant in a ternary mixture with tocopherols and lecithin.

It is of course expected that ascorbic acid by itself has no effect, since it has been rejected by practitioners of the art as a stabilizing agent for carotenoids. Table 4-1 substantiates this belief. That ascorbic acid may be activated into a form more powerful than its oil soluble palmitic ester, or other known antioxidants, is entirely new to the art, and totally unexpected, as well as its increasing antioxidant, rather than prooxidant effect as the concentration increases. No explanation of this activation of stabilization capacity for carotenoids is available.

EXAMPLE 5

Expression of Synergism Between the Activated Ascorbic Acid Complex and Other Natural Antioxidants It is well known that extracts of Labiatae, and particularly those of rosemary and sage, are potent oil soluble antioxidants. What is not appreciated is their greater effectiveness in the stabilization of carotenoids, such as those present in paprika, as well as synthetic carotenoids such as beta-apo-8-carotenal, than the synthetic antioxidants which are now legally permitted.

Copending applications deal with the ability of certain emulsifiers to increase the stability of carotenoids, and to show synergistic effects with other oil soluble antioxidants. This example shows the unexpected synergism which occurs between typical activated ascorbic acid and rosemary extract when used with oleoresin paprika, as well as enhancement of this synergism by the addition of a second emulsifier.

The compositions of the oleoresins which were evaluated is provided in Table 5-1, which also reports the increase in $\frac{1}{3}$ lives at 65 deg. C. due to the additives. The synergism is also shown, which is expressed as the difference between the actual increase of the sample and the added increase of the two components by themselves. This increase is also expressed as a % of the $\frac{1}{3}$ life of the control, which was 36 hours.

TABLE 5-1

Synergistic effect of activated ascorbic acid and rosemary extract, 65 deg. C.

| Composition, % | | | | | | Increase in $\frac{1}{3}$ life, hrs over | | | |
|---|---|---|---|---|---|---|---|---|---|
| paprika (1) | SBO (2) | 10-1-CC (3) | 8-1-0 (4) | AAA (5) | RM (6) | control (7) | emul. (8) | syn (9) | % syn (10) |
| 50 | 50 |  |  |  |  | 0 |  |  |  |
| 50 | 25 | 24 |  | 1 |  | 134 |  |  |  |
| 50 | 24 |  | (24 + 1) |  |  | 203 |  |  |  |
| 50 | 48 |  |  |  | 2 | 30 |  |  |  |
| 50 | 23 | 24 |  | 1 | 2 | 188 | 134 + 30 | 24 | 67% |

TABLE 5-1-continued

Synergistic effect of activated ascorbic acid and rosemary extract, 65 deg. C.

| Composition, % | | | | | | Increase in ½ life, hrs over | | | |
|---|---|---|---|---|---|---|---|---|---|
| paprika (1) | SBO (2) | 10-1-CC (3) | 8-1-0 (4) | AAA (5) | RM (6) | control (7) | emul. (8) | syn (9) | % syn (10) |
| 50 | 23 | | | (24 + 1) | 2 | 242 | 203 + 30 | 9 | 25% |

These important synergistic effects are typical of activated ascorbic acid, and are also experienced with sage and thyme extract. Utilization of the technique described for measuring ½ life, which is new to the art, will enable the practitioner to devise optimum synergistic combinations of activator, ascorbic acid, natural oil-soluble antioxidant, and diluent such as vegetable oil to meet specific needs.

The amazing stability of 278 (36+242) hours is 775% of that of the control, and it is achieved with natural antioxidants. No known combination of synthetic or natural materials approaches this stability, it being totally dependent upon the activated ascorbic acid, activating emulsifier, and synergistic effect of rosemary.

The synergistic effect is increased by the addition of sorbitan trioleate (STO), and lowering the temperature of the oven to 50 degrees C., as shown in the following example and portrayed in FIG. 2. The ascorbic acid was activated in 10-1-CC by the method of Example 1, using methanol-water and removing it to less than 1% water content.

TABLE 5-2

Synergistic effects of STO + 10-1-CC/AAA on the effect of rosemary extract, 50 deg. C.

| Composition, % | | | | | | ½ life, hours, 50 deg. C. | | | |
|---|---|---|---|---|---|---|---|---|---|
| ORP | SBO | RM | STO | 10-1-CC | AAA | actual | dC | ddRM | % syn, RM |
| 50 | 50 | | | | | 115 | | | |
| 50 | 48 | 2 | | | | 174 | 59 | | |
| 50 | | 2 | 23 | (24 + | 1) | 665 | 550 | | |
| 50 | | 2 | 23 | (24 + | 1) | 730 | 675 | 125 | 212% |

(dC = difference from control; ddRM = difference from RM control attributable to the 10-1-CC + AAA; % syn is = 125/59 = 212%), the increased effectiveness, attributable to the addition of sorbitan trioleate and the activated ascorbic acid in 10-1-CC to rosemary).

Figure 2:
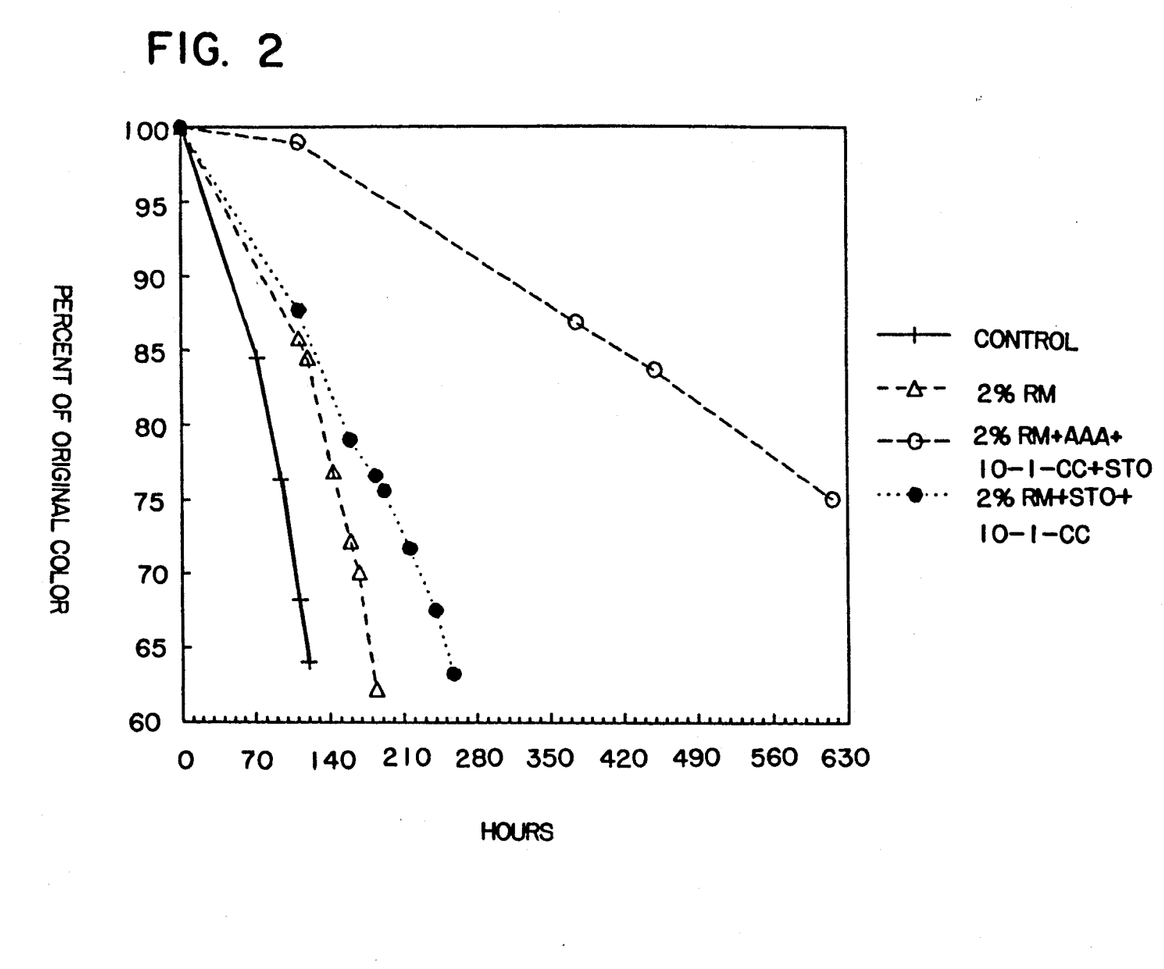
FIG. 2 is a graph showing the comparative fading rates of 2% weight by weight dispersions of oleroesin paprika at 50° C. wherein the abscissa shows the percent of original color at 460 nm retained by the sample and the ordinate shows the time period in hours required for ⅔ of the color to fade, thereby to provide the standard "⅔ life", there being a control and three (3) color-stabilizing compositions in the test, the RM, the RM plus STO plus 10-1-CC, and the RM plus AAA plus 10-1-CC plus STO curves illustrating the effectiveness of compositions of the present invention, their superiority in stabilizing oleoresin paprika against color fading being readily apparent from the graph of FIG. 2. (See Example 5).

The curves of FIG. 2, which show the fading rates of the different paprika preparations, portray the continued improvement in stability as rosemary, rosemary combined with two emulsifiers which stabilize the paprika by themselves (STO+10-1-CC), these same emulsifiers with activated ascorbic acid, and finally these emulsifiers, activated ascorbic acid, and rosemary. It is clear that the activated ascorbic acid alone has an exceptionally dramatic effect, which is further enhanced by combination with rosemary. The effectiveness of this combination with rosemary extract is completely unexpected and unpredictable, and is the preferred form of the invention for stabilization of carotenoids.

The concepts and disclosures in this specification will enable the practitioner to devise formulations uniquely adapted to the specific needs of a given food, or food system.

Ethoxyquin, a synthetic antioxidant of questionable safety, is explicitly allowed for the stabilization of pigments in paprika for use in human food, at a level of no more than 0.01%, it being the most powerful carotenoid stabilizer heretofore known. It is also permitted for use in animal feeds to stabilize carotenoids. Its effectiveness at a dose of 0.01% is on the same order of magnitude as rosemary extract at 2%. The activated ascorbic acid of this invention obviously provides an improved, healthy, and economical alternative for stabilizing paprika, food, and animal feeds.

EXAMPLE 6

The Stabilization of Other Carotenoids with Activated Ascorbic Acid

The effectiveness of activated ascorbic acid is not limited to oleoresin paprika, but is also shown with other carotenoids, such as bixin and norbixin, natural carotenes and xanthophylls, and synthetic carotenoids such as beta-carotene, beta-apo-8-carotenal, canthaxanthin, and the like.

Not only does activated ascorbic acid protect against oxidative damage upon dispersion of these pigments on a solid substrate, but it protects against loss of color due to heat, as occurs during frying or when popping corn. This example portrays this improvement using an annatto pop-corn color, and beta-carotene, both of which are used in this type of application.

A. Bixin. Fifty parts of a commercial pop-corn color, Vegetone ®, containing 5.3% bixin and 1.8% curcumin (a non-carotenoid pigment), was used as is; with 3.5 parts added BHT; with 4 parts added Herbalox-O ®; and with 4 parts added Herbalox-O ® plus 25 parts of 4% activated ascorbic acid in 10-1-CC and in GMO. Each preparation was diluted to a total of 100 parts with soy bean oil, to give preparations of equal pigment content.

These preparations were added at a level of 0.2% to soy bean oil, the soy bean oil-color was held at 320 deg. F. for 5 and 10 minutes, and the % of the original color determined using a spectrophotometer. The results, as reported in Table 6-1, show that the commonly used synthetic, BHT, and unactivated ascorbic acid, are ineffective. It shows that Herbalox shows some activity, and that the activated ascorbic acid has a significant effect.

TABLE 6-1

| Composition | The % color loss at 487nm of bixin in soy oil after five and ten minutes at 320 deg. F. | | | | | | % color loss, min. | |
|---|---|---|---|---|---|---|---|---|
| Vegetone (R) | SBO | BHT | Herbalox | AAA | GMO | 10-1-CC | 5 | 10 |
| 50 | 50 | | | | | | 80 | 94 |
| 50 | 43.5 | 3.5 | | | | | 81 | 95 |
| 50 | 46 | | 4 | | | | 72 | 93 |
| 50 | 21 | | 4 | 1 | 24 | | 65 | 81 |
| 50 | 21 | | 4 | 1 | | 24 | 67 | 83 |

The table shows that, of the two activating emulsifiers, glycerol monooleate is preferable to decaglycerol mono capric-caprylate.

B. Beta-carotene. 13 parts of a 30% suspension of beta-carotene was mixed with 62 parts of soy bean oil, to give a liquid suspension (Solution A). This in turn was added to soy oil in an amount to give 0.0175% beta carotene in the oil. This was the control solution. 25 parts of 4% activated ascorbic acid in glycerol monooleate was added to 75 parts of Solution A, to make Solution B. This in turn was added to soy oil to give a 0.0175% concentration of beta-carotene, which was the test solution. Both oils were immersed in an oil bath at 144 deg C. for 10 minutes. The control had lost 27% of its color and the test 12% of its color, as measured at 487 nm. This example demonstrates the effectiveness of the activated ascorbic acid in stabilizing synthetic carotenoids, in addition to naturals such as those found in annatto and paprika.

EXAMPLE 7

The Stabilization of Animal Fats

Animal fats are considered to be less stable than vegetable oils. Poultry fat in particular is very unstable, due to its high degree of unsaturation. This example demonstrates the efficacy of activated ascorbic acid in stabilizing chicken fat. It is equally useful for stabilizing pork fat, high omega-3 fish oils (see Example 3 and the related canola oil), and more stable beef fat.

Freshly rendered chicken fat was clarified, and dosed as shown in Example 7-1 with the activated ascorbic acid which was activated as indicated. The fats were tested for induction times in hours on the Rancimat at 110 degrees C., and results as well as ratios to controls, are reported. The Schall oven stabilities at 65 deg. C. were also determined, with the peroxide values at the end of 4 and 7 days being reported.

TABLE 7-1

Composition of chicken fat stabilized with activated ascorbic acid, tocopherols, and ascorbic acid alone.

| % of stabilizer in fat | | | | Induct. Time, | Peroxide value, day 4 | |
|---|---|---|---|---|---|---|
| GMO | AAA | AA | tocopherols | hrs. | day 4 | day 7 |
| control | | | | 2.51 | 9.6 | 24.9 |
| 2.4 | 0.1 | | | 4.57 | 3.8 | 13.4 |
| 2.4 | 0.1 | | 0.05 | 13.6 | 3.8 | 9.6 |
| 0 | 0 | | 0.05 | 11.6 | 15.3 | 19.2 |
| | | 0.1 | | 2.55 | — | — |

The above Table not only shows that the activated ascorbic acid is effective by itself, based both on induction times and peroxide values, but that it inhibits the development of high peroxide values when tocopherols are present. It should also be noted that tocopherols, while effective in prolonging the induction time, are not effective in preventing peroxide development. Activated ascorbic acid is not as effective as tocopherols in increasing the induction time, but is more effective in inhibiting peroxide development. Consequently, the combination is much preferred. That such a double action can be obtained by a combination of the two antioxidants is novel and new to the art.

The same principles apply to combinations with other natural antioxidants, including rosemary, sage, thyme, and tea extracts, as will be apparent to one skilled in the art as they use the comparative techniques of this example.

EXAMPLE 8

Typical Applications of Activated Ascorbic Acid

Because of the greatly improved stability of both fats and carotenoids, applications in which both together are subject to oxidative stress are obvious to the food scientist, for example, breading mixes contain fats as well as carotenoids. Dispersions such as shown in prior examples are widely used in the food industry, with or without other carotenoids or seasonings, and these dispersions have been shown be to stabilized by the activated ascorbic acid. The ⅔ life of between 200 and 300 hours at 65 deg C. represents an increase in the expected shelf life of the flour salt dispersion of Example 4 at ambient temperature from about 30 days for unstabilized oleoresin paprika to about 250 to 350 days for the stabilized. On solids which are less prooxidant than salt, such as dextrose, flour, and breadings, the shelf life will be substantially greater. In such a case, it is other ingredients, and not the carotenoids, which deteriorate first.

The activated ascorbic acid can also be used to stabilize paprika. For example, paprika flesh was dried to 4% moisture and ground. To one portion, 2.5% of a 4% solution of AAA in GMO was added with agitation. To a second portion, sufficient water was added to rehydrate to the normal level of 8-12%, and the AAA in GMO added. Stability was evaluated at 65 deg. C., and the ⅔ life of both samples was 158% of the control. This example not only shows that AAA protects carotenoids embedded in paprika flesh, but that normal rehydration which is done artificially by adding water, or naturally by allowing the flesh to stand in air, does not interfere. Obviously, such a stabilized paprika pigment should be used in animal feeds, such as poultry or fish, wherein the carotenoids are used to color the yolk or flesh of the animals. The invention is equally effective in stabilizing marigold pigments, or synthetic carotenoids such as canthaxanthin, when used in feeds. The synergistic combination of the AAA with other natural antioxidants, and non-ionic surface active agents, is of course beneficial.

As shown in Example 6, AAA retards the degradation of carotenoids when exposed to heat. Since it also retards oxidation of fats when heated, it is particularly effective in deep fat frying operations, wherein it is desired to prevent color loss as well as initiation of fat oxidation. It is equally well adapted to the stabilization of fat, or of pigmented fat in a batter, prior to baking. Synergistic combinations with other natural antioxidants are beneficial in these applications, to further increase the shelf life of the snack or baked food, and preserve the brightness of the color.

Another obvious application of stabilized oils is in dressings, where the oil is added on top of the vinegar. Furthermore, in such dressings as mayonaise, which is a water in oil emulsion, the AAA, if added to the oil at the refinery, will prevent initiation of oxidation prior to manufacture of the mayonaise, and thereby increase its shelf life. Indeed, AAA is preferably added to vegetable oil or animal fat at the refinery, to inhibit initiation of oxidation. As was shown with canola oil, the AAA inhibits degradation of omega three fatty acids, which are an important constituent of fish oils. Addition of the AAA to fish oils immediately at the end of refining is also advantageous. These fish oils then have increased stability when incorporated into capsules. Likewise, preparations of Vitamin A, as well as retinoids, which are related to carotenoids, can be stabilized. Cloudiness of the oil is not objectionable in these applications, so that overdosing as may occur in practise is not harmful.

The AAA is also useful for the stabilization of terpenes and flavorings, such as limonene, orange oil or spice extracts. It is also an effective antioxidant in a chewing gum base, and such a stabilized base will enhance the stability of the gum flavoring, such as a mint oil. Other uses will be apparent to one skilled in the art, the above illustrations being non-limiting and intended only for the purpose of demonstrating the range of usefulness of activated ascorbic acid.

EXAMPLE 9

Classification of Non-Ionic Synthetic Surface Active Agents (Emulsifiers) in Relation to Activation and Synergistic Effects It is clear from the foregoing examples that many combinations of activated ascorbic acid in surface active agents, as well as combinations of AAA with other antioxidants and surface active agents which have stabilizing properties, can be made. Because there are so many food grade emulsifiers available, it will be helpful to one practising the art to evaluate their desired combinations using the technique shown in the prior Examples. The following classification of emulsifiers may also provide assistance in selection.

For the purposes of this specification, non-ionic emulsifiers are separated into five classes: (1) those exhibiting strong stabilizing and synergistic properties; (2) those exhibiting strong activating properties; (3) those with modest activating properties and modest synergistic properties; (4) propylene glycol; and (5) those with strongly destabilizing effect and/or inability to activate the ascorbic acid.

The latter class is specifically excluded from the field of this invention, since it has a strong negative effect on the synergism which is expressed between AAA and rosemary, tocopherols, and the like, as well as on the stability of the dispersions of the oils and/or pigments on solid substrates.

It will occur to the practitioner, as the table is studied, that the classification is independent of the hydrophil-lipophil balance of the emulsifier. Accordingly, this invention enables the practitioner to design a stabilizing system for paprika pigments, other carotenoids, and fats and oils which is best adapted to the physical needs of the specific food in which the coloring or oil will be used.

(1) Surface active agents or emulsifiers with strong stabilizing and synergistic properties.
  sorbitan esters, such as mono and tri oleates and stearates
  lactic acid esters of mono and diglycerides
(2) Surface active agents or emulsifiers with strong activating properties.
  polyglycerol esters, such as octaglycerol monooleate, decaglycerol capric-caprylate, and decaglycerol tetraoleate
  mono-diglycerides, such as glycerol mono-oleate
(3) Surface active agents or emulsifiers with modest synergistic and activating properties.
  acetylated monoglycerides
  citric acid esters of mono-diglycerides
  propylene glycol esters of fatty acids
(4) propylene glycol, which has activating properties but negative synergistic properties
(5) Surface active agents or emulsifiers with destabilizing and/or anti-synergistic properties.
  acetylated tartaric acid esters of mono diglycerides
  triacetic acid ester of glycerine
  polyoxyethylene derivatives, such as polyoxyethylene
  sorbitan monooleate and stearate. (Exceptionally destabilizing and anti-synergistic).

Emulsifiers in the second class are the preferred embodiment of this invention, whereas those in the third and fourth classes are less preferred, and those in the fifth class are surprisingly deleterious. Those in the first class are preferred in combination with those of the second class, for expression of synergism with natural antioxidants. It is remarkable that, except for the polyoxyethylene derivatives, there is no structural relationship between the emulsifiers and the classes into which they fall. Emulsifiers falling within the first four classes are within the scope of this invention, and the practitioner should recognize that even though it may appear desirable to include an emulsifier of the fifth class in a composition, because of its superior emulsification properties, it will detract from the stabilizing emulsifiers and synergisms, and every effort to avoid inclusion of even incidental amounts should be made.

EXAMPLE 10

The Effect of Water in the Activated Ascorbic Acid Compositions, and Levels Thereof Which Deactivate the Ascorbic Acid or Otherwise Make the Preparations Unacceptable for Stabilization of Vegetable Oils and Carotenoids The prior examples have utilized essentially anhydrous (less than 2% water) preparations of activated ascorbic acid, which are the preferred form of the invention. Such preparations are stable indefinitely, and can be stored at room temperature.

While it is very easy to remove essentially all the water when it is used as a cosolvent, if as much as 4% or 5% remains, it will not impair the effectiveness of the activated ascorbic acid when it is used in combination with a carotenoid dispersed on a solid substrate, particularly if the substrate is then allowed to equilibrate with atmospheric moisture. Indeed, if 4% by weight of water is added to a mixture of, for example, oleoresin paprika, SBO, 10-1-CC, and AAA combined in a proportion of 50:25:24.5:0.5, the ⅞ life is the same as the sample without water when dispersed on flour salt at 2%, and held at 65 degrees C.

A similar evaluation was made using soy bean oil on the Rancimat® at 110° C. and 18 liters air/hour. A sample of SBO was dosed with a 2.5% AAA in glycerol monooleate preparation, and a second sample with the same 2.5% AAA in GMO to which 4% water had been added. The induction time of the sample with added water was 84% of the essentially anhydrous sample, showing that the upper limit of moisture content of the AAA preparation is about 5%. Since the water was promptly evaporated at 110° C., this example also shows that small amounts of water only slightly deactivate the ascorbic acid, and that its effectiveness surprisingly remains in dry oil.

In this connection, it should be pointed out that the AAA preparation remains effective in emulsions, in which it is incorporated into the oil phase. For example, mayonnaise, which is a water in oil emulsion, is stabilized by incorporating the AAA in the oil, preferably after inversion of the emulsion, so that it is uniformly distributed in the continuous oil phase. This oil phase is subjected to oxidation due to entrained air, and is protected by the AAA. If unactivated ascorbic acid is added directly, it dissolves in the aqueous internal phase of the emulsion, and is without effect in the oil.

EXAMPLE 11

Unacceptability of Lecithin/Ascorbic Acid Combinations as Substitutes for AAA/Fatty Acid and Propylene Glycol Compositions The soy bean oil used in this example, as in the other examples of this specification, has been refined so as to remove all lecithin from the crude oil. The presence of lecithin causes discoloration and flavor degradation of the oil on storage, and is therefor removed from refined vegetable oils.

The prior art shows a ternary mixture of tocopherols, lecithin, (an ionic phospholipid), and ascorbic acid as an effective antioxidant in such oils. Perhaps the degradation of the oil due to lecithin is inhibited by the tocopherol-ascorbic acid combination, thereby taking advantage of the strong anti-oxidant power of lecithin as measured by the Rancimat and peroxide values.

This example uses soy oil to which has been added GMO/AAA, GMO/AA, lecithin, lecithin+dry AA, and lecithin+AA dissolved in solvent and then desolventized. The GMO contained 4% AA or AAA and was added at a 2.5% level. The lecithin contained 10% AA or dissolved AA. In all cases the level of AA or AAA in the soy oil was 0.1%. The Rancimat stabilities at 110 deg. were observed, as was discoloration after storage at ambient for three months. These results are reported in Table 10-1. PG/AAA performs comparably with GMO/AAA.

TABLE 10-1

| Preparation | Comparative effects of AAA in non-ionic emulsifiers and AA in lecithin. | | |
|---|---|---|---|
| | Rancimat. | % of C | color, three months |
| control | 7.6 hrs | 100% | little change, if any |
| GMO | 7.5 | 98 | " |
| GMO + AA | 8.0 | 105 | " |
| GMO + AAA | 20.5 | 277 | " |
| lecithin | 19.4 | 262 | amber |
| lecithin + AA | 43.4 | 586 | very dark amber |
| lecithin + | 28.0 | 378 | dark brown |

TABLE 10-1-continued

| Preparation | Comparative effects of AAA in non-ionic emulsifiers and AA in lecithin. | | |
|---|---|---|---|
| | Rancimat, | % of C | color, three months |
| dissolv. AA | | | |

It is thus clear that not only does the dissolution of AA in solvent activate it using a non-ionic emulsifier, but that dissolution deactivates it in the case of lecithin. (Note that the lecithin preparation in which the AA has been predissolved has a 210% less effectiveness than the directly added AA.) It is also obvious that not only does lecithin cause discoloration itself, but that the rate of discoloration is substantially increased with AA present, and that predissolved AA surprisingly causes even more rapid discoloration, even though it is a less effective antioxidant. Perhaps this is why tocopherols are required in the prior art preparation.

Peroxide values were also run using the above oils. The time to reach a PV of 70 was only 50% of that of the control for GMO/AA; whereas the GMO/AAA was 163% of the control. This shows that the unactivated AA is pro-oxidant, whereas upon activation it is an anti-oxidant. The lecithin solutions were also tested for Schall oven stability at 65 deg., and after 19 days, when the GMO tests were completed, even the lecithin control had not reached a PV of 70. Therefor, in this test, lecithin itself is a powerful antioxidant. It was noted that even when the lecithin-AA samples were at a PV of 4, discoloration was intense, with the AA being amber, and the predissolved AA being a brown. Consequently, at least in the absence of tocopherols, lecithin and AA are unsatisfactory, and most particularly so if the lecithin-AA are prepared in a mutual solvent.

From the above Example, it is clear that the AAA of this invention, created in a non-ionic emulsifier which is a fatty acid ester of a polyol or polybasic organic acid, or propylene glycol, is different in performance and reactivity than similarly prepared combinations of AA and lecithin. While the latter is not acceptable per se for incorporation in fats and oils and the stabilization of carotenoids, the products of this invention are highly advantageous, neither being pro-oxidant or discolorants as dosage levels increase. Furthermore, the activation of AA in the non-ionic emulsifiers changes the AA from a prooxidant to an AAA form which is strongly antioxidant; whereas the predissolution of AA and lecithin weakens the antioxidant power over dry AA+lecithin, while accelerating the discoloration.

According to the present invention, preferred non-ionic surface-active agents are monoglycerides of a fatty acid and polyglycerol esters of a fatty acid, especially glycerolmonooleate and decaglycerol capric-caprylate and, where two nonionic surface-active agents are present, they are preferably selected from among these groups.

With respect to products stabilized against oxidative deterioration according to the present invention, vegetable oil, especially soybean oil, and carotenoids, especially oleoresin paprika, are preferred.

As far as the proportions of ingredients in the compositions of the invention, ascorbic acid is preferably present in amount of at least about 1% by weight, preferably about 2% to 8% by weight of the total composition and, when present, the natural antioxidant is preferably present in a minimum amount of 2% of the activated ascorbic acid preparation, preferably 4% to 10% by weight or even higher, and the same percentages prevail for Labiatae extracts, such as rosemary, sage, or thyme extract, tea extract, and tocopherols, the only upper limit being one of economics and the only lower limit being one of operativeness. The resulting product is in each case a solution of the activated ascorbic acid in the propylene glycol or nonionic surface-active agent, the exact definition of the product as a solution or a solution-suspension being fundamentally dependent upon the amount of the ascorbic acid introduced into the composition, the more introduced the more likely that the product will be a solution-suspension rather than a simple solution.

It is thus seen that the present invention provides an activated ascorbic acid and compositions thereof, especially such essentially anhydrous compositions as embody propylene glycol or a nonionic surface-active agent, such products having increased antioxidant activity in fats, oils, carotenoids, and fatty foods, especially such materials and products as are exposed to oxidative stress, as well as a method of stabilizing such materials and products against oxidative discoloration, feeds and foodstuffs which may encounter oxidative stress stabilized with a composition of the invention, and a method of stabilizing a feed or foodstuff or flavoring with such a more effective antioxidant composition of the invention. The stabilization of carotenoid pigments may advantageously be carried out in the presence of a particulate edible solid substrate for the carotenoid pigment. Synergistic effects are obtained by the incorporation of a natural antioxidant in such compositions and methods and the antioxidant effectiveness of the compositions and methods is further greatly enhanced by inclusion of a natural Labiatae antioxidant, tea extract, or a tocopherol therein, and antioxidant power and stabilization effectiveness is frequently further improved by inclusion therein of a second nonionic surface-active agent. All of the foregoing provide long-awaited solutions to previously-existing oxidation and instability problems not adequately solved by the prior art.

It is to be understood that the invention is not to be limited to the exact details of operation, or to the exact compositions, methods, procedures, or embodiments shown and described, as obvious modifications and equivalents will be apparent to one skilled in the art, and the invention is therefore to be limited only by the full scope which can be legally accorded to the appended claims.

I claim:

1. An activated ascorbic acid product having increased antioxidant activity especially in fats, oils, and fatty foods, consisting essentially of ascorbic acid in solution in
    (A) propylene glycol or
    (B) a nonionic surface-active agent, the solution being essentially anhydrous and, in the case of (B) the activated ascorbic acid-surface-active agent product being prepared by dissolving the ascorbic acid in the nonionic surface-active agent in a liquid medium and removing solubilizing medium.

2. An activated ascorbic acid product according to claim 1 wherein the nonionic surface-active agent is selected from the group consisting of
    a. mono and di glycerides of fatty acids,
    b. polyglyceride esters of fatty acids,
    c. mono and diglyceride esters further esterified with a dibasic organic acid taken from the class consisting of citric and lactic acids,
    d. acetylated mono and diglyceride esters further esterified with a dibasic organic acid taken from the class consisting of citric and lactic acids,
    e. sorbitan esters of fatty acids, and.
    f. propylene glycol esters of fatty acids.

3. The product of claim 2, wherein the product contains less than about 5% water, and wherein the solubilizing medium consists essentially of a solvent selected from the group consisting of methanol, ethanol, isopropanol, and water, and mixtures thereof.

4. A method of preparing an activated ascorbic acid having increased antioxidant, activity, especially in fats, oils, and fatty foods, consisting essentially of the step of dissolving the ascorbic acid in (A) propylene glycol or (B) a nonionic surface-active agent, in the case of (B) in the presence of a liquid medium and removing solubilizing medium, to give an activated ascorbic acid product which is essentially anhydrous.

5. A method of claim 4 wherein the nonionic surface-active agent is selected from the group consisting of
    a. mono and di glycerides of fatty acids,
    b. polyglyceride esters of fatty acids,
    c. mono and diglyceride esters further esterified with a dibasic organic acid taken from the class consisting of citric and lactic acids,
    d. acetylated mono and diglyceride esters further esterified with a dibasic organic acid taken from the class consisting of citric and lactic acids,
    e. sorbitan esters of fatty acids, and
    f. propylene glycol esters of fatty acids.

6. A method of claim 5 wherein no more than about 5% water is left in the product, and wherein the solubilizing medium consists essentially of a solvent selected from the group consisting of methanol, ethanol, isopropanol, and water, and mixtures thereof.

7. An activated ascorbic acid having increased antioxidant activity especially in fats, oils, and fatty foods, consisting essentially of ascorbic acid dissolved in propylene glycol.

8. The product of claim 1, 7, or 2 wherein the product contains less than about 5% water by weight.

9. The product of claim 1, 7, or 2, wherein the solubilizing medium comprised a solvent selected from the group consisting of methanol, ethanol, isopropanol, and water, and mixtures thereof.

10. An activated ascorbic acid product of claim 1, 7, or 2, including also a natural antioxidant selected from the group consisting of a Labiatae extract, a tea extract, and a tocopherol.

11. A product of claim 10, wherein the natural antioxidant is a rosemary, sage, or thyme extract.

12. A product of claim 10 or 11, and comprising a weight percentage of natural antioxidant of the at least 2% by weight.

13. A product of claim 1, 7, or 2, comprising also a second nonionic surface-active agent incorporated into the antioxidant composition.

14. A carotenoid, fat or oil, a food, a feed, or a chewing-gum base which has been protected against oxidative deterioration by having incorporated therein an activated ascorbic acid product of claim 1, 3 or 5, 2, or 7.

15. The product of claim 14 wherein the stabilized product is a carotenoid.

16. A product of claim 15 wherein the carotenoid is oleoresin paprika.

17. The product of claim 14 wherein the stabilized product is a fat or oil.

18. The product of claim 14 wherein the stabilized product is a food or feed, or chewing-gum base.

19. A method of stabilizing a carotenoid, a fat or oil, a food, a feed, or a chewing-gum base which consists essentially of the step of incoroporating therein an activated ascorbic acid product of claim 1, 2 or 7.

20. A method of claim 19 for stabilizing a carotenoid.

21. A method of claim 19 for stabilizing a fat or oil.

22. A method of claim 19 for stabilizing a food or a feed or a chewing-gum base.

23. A product of any of claims 1, 2 or 7 wherein the amount of ascorbic acid is at least 1% by weight.

24. A product of any of claims 1, 2 or 7 wherein the amount of ascorbic acid is about 2% to about 8% by weight.

25. A product of claim 28 wherein the nonionic surface-active agent is a monoglyceride of a fatty acid or a polyglycerol ester of a fatty acid.

26. A product of claim 25 wherein the nonionic surface-active agent is glycerol monooleate or decaglycerol capric-caprylate.

27. A product of claim 26 including a Labiatae extract in amount of about 4% to about 10% by weight.

28. A product of claim 27 wherein the Labiatae extract is a rosemary, sage, or thyme extract.

29. A product of claim 25 including a Labiatae extract in amount of about 4% to about 10% by weight.

30. A product of claim 29 wherein the Labiatae extract is a rosemary, sage, or thyme extract.

31. The method of stabilizing oleoresin paprika which consists essentially of the step of incorporating therewith a composition of any of claims 1, or 5 wherein the amount of ascorbic acid is at least 1% by weight.

32. A product of claim 1, 2 or 7 wherein the water content is not more than about 2% by weight.

33. An activated ascorbic acid product of claim 1, 2 or 7 including tocopherol as a natural antioxidant.

34. A method of preparing an activated ascorbic acid having increased antioxidant, activity, especially in fats, oils, and fatty foods, consisting essentially of the step of dissolving ascorbic acid in propylene glycol.

35. A method of claim 4, 34, or 5 wherein no more than about 5% water by weight is left in the product.

36. A method of claim 4, 34, or 5, wherein the solubilizing medium comprises a solvent selected from the group consisting of methanol, ethanol, isopropanol, and water, and mixtures thereof.

37. A method of claim 4, 34, or 5, including a natural antioxidant selected from the group consisting of a Labiatae extract, a tea extract, and a tocopherol.

38. A method of claim 37, wherein the natural antioxidant is a rosemary, sage, or thyme extract.

39. A method of claim 37 or 38, and comprising a weight percentage of natural antioxidant of the at least about 2% by weight.

40. An activated ascorbic acid product prepared according to the method of claim 4, 34, or 5.

41. A method of claim 4, 34, 5, or 6 wherein nor more than about 2% water by weight is left in the product.

42. A method of claim 4, 34 or 5 wherein tocopherol is included as a natural antioxidant.

* * * * *